United States Patent Office 3,125,113
Patented Mar. 17, 1964

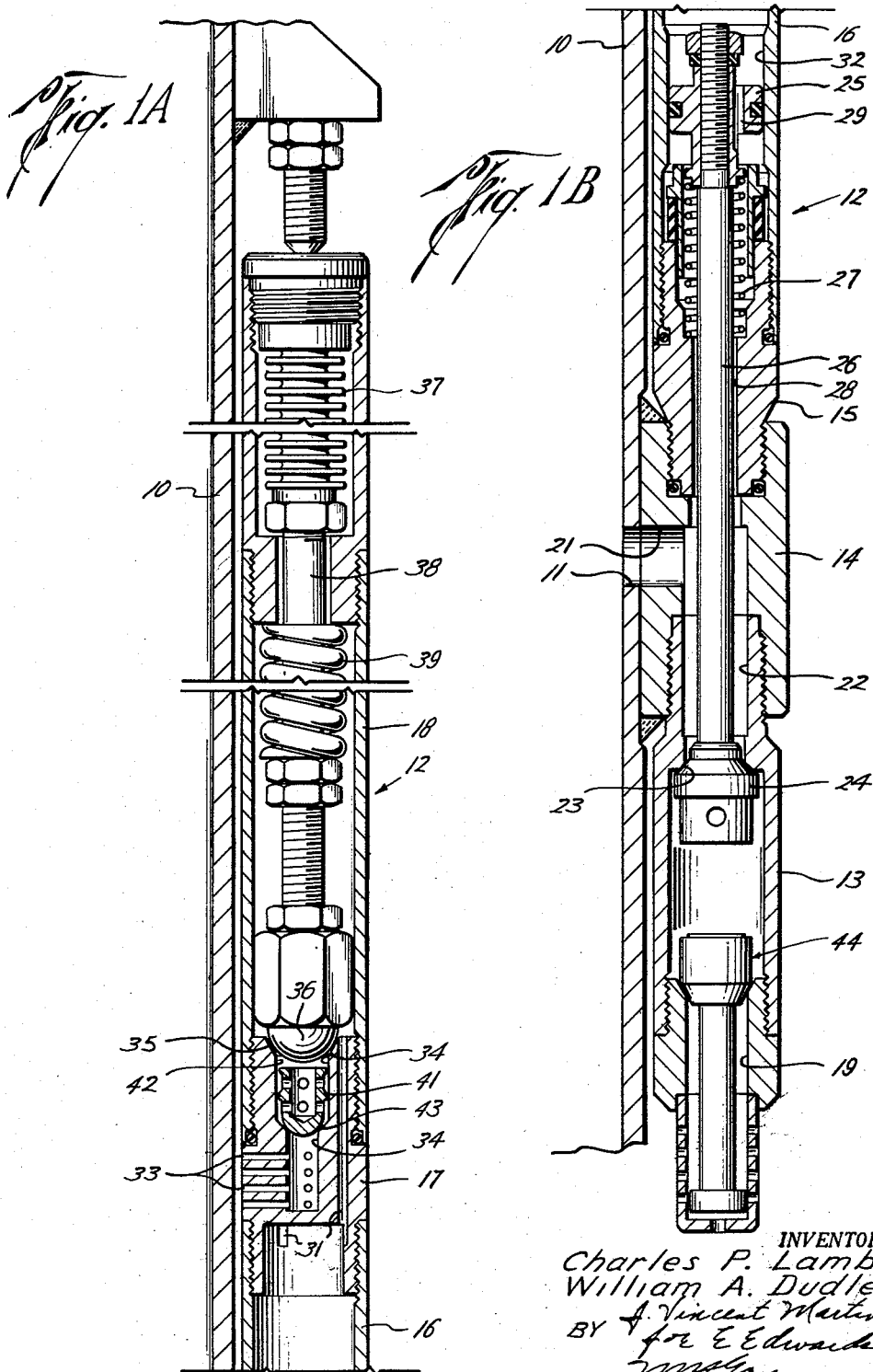

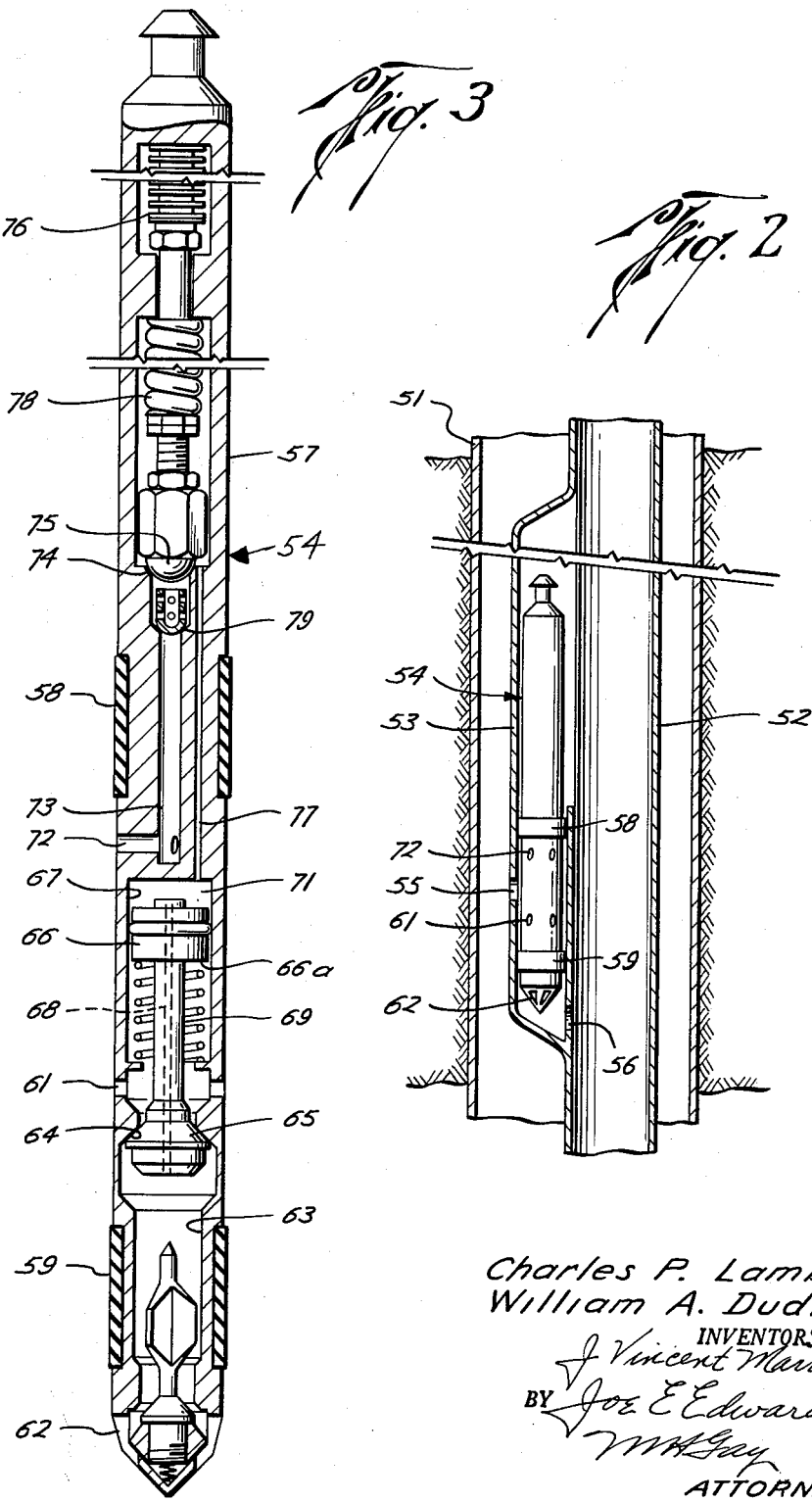

3,125,113
GAS LIFT VALVE
Charles P. Lamb and William A. Dudley, Dallas, Tex., assignors to Merla Tool Corporation, Dallas, Tex., a corporation of Texas
Filed Jan. 26, 1961, Ser. No. 85,039
7 Claims. (Cl. 137—155)

This invention relates to gas lift valves and particularly to gas lift valves of the pilot operated type.

In pilot operated gas lift valves it has been customary to expose the interior of the bellows housing to the pilot gas. The portion of the valve member within the seat when the pilot valve is seated has been exposed to the outlet or tubing pressure. See the patent to R. O. Walton No. 2,594,831 for an example of this type of pilot operated valve.

It will be noted from the Walton patent referred to above that the main valve is controlled by a fluid motor. One side of the fluid motor is connected to the main outlet of the valve through a bleed passage. This bleed passage permits reduction of casing pressure on one side of the fluid motor to tubing pressure after the pilot valve closes. This bleed passage is susceptible of becoming clogged with trash.

Desirably, gas lift valves of this type should snap open and closed, and every tendency of the valve to fail in operation should be minimized. It is therefore the principal object of this invention to provide a pilot controlled gas lift valve of the type discussed above in which the valve will close with a more rapid snap action and in which the bleed passageway may be enlarged to minimize the possibility of malfunction of the valve due to trash.

Another object is to provide a pilot operated gas lift valve in which the effect of a small leak in the pilot valve seat is minimized.

Another object is to provide a pilot operated gas lift valve in which the pilot valve seat is self-cleaning.

Another object is to provide a pilot operated gas lift valve in which a simple ball type back-check valve may be employed to prevent back flow of pilot gas.

Any enlargement of the bleed passage of the prior art pilot operated gas lift valves requires an enlargement of the pilot valve and seat. As the effective area of the bellows is determined by the effective area of the pilot valve seat, such enlargement of the pilot valve seat reduces the effective area of the bellows. This increases the spread in pressure at which the main valve opens and closes. This is objectionable and, if the bleed and pilot valves are to be enlarged in size, the effective area of the bellows must not be decreased.

In accordance with this invention, the bleed passageway and pilot valve seat are enlarged in area without decreasing the effective area of the bellows by reversing the elements of the pilot valve assembly exposed to casing and tubing pressure. In the past the pilot valve within the pilot valve seat has been exposed to outlet or tubing pressure. The bellows has been exposed to inlet or casing pressure. We propose to reverse this relationship and, when the pilot valve is seated, expose the interior of the pilot valve seat to inlet or casing pressure and the bellows to outlet or tubing pressure. Inasmuch as the effective area on which casing pressure has been operating on the bellows is much greater than the area of the prior art valve seat, the pilot valve seat may be greatly enlarged in accordance with this invention without disturbing the spread of pressure at which the main valve will open and close.

In the drawing, wherein an illustrative embodiment of this invention is shown, FIGURES 1a and 1b, which is a continuation of FIGURE 1a, show a flow tubing and a gas lift valve constructed in accordance with this invention partially in vertical cross section and partially in elevation;

FIGURE 2 is a view in cross section through a fragment of a cased well having a flow tubing therein and showing a wire line type of valve in elevation mounted in the tubing; and, FIGURE 3 is a schematic view in vertical cross section of the valve shown in FIGURE 2.

The flow tubing 10 represents a conventional production tubing for a producing oil well. The tubing has a side door inlet 11 for communication with a gas lift valve through which gas is introduced into the tubing to assist in lifting oil within the tubing to the surface.

The gas lift valve indicated generally at 12 has a multi-piece housing for ease of assembly. The housing includes an inlet valve thimble 13 at its lower end which is secured to an inlet lug 14. Above the lug 14 the housing is provided by an adapter 15, a piston pressure housing 16 above adapter 15, a pilot seat adapter 17 above the piston pressure housing, and finally an elongate bellows housing 18 at the upper end of the valve.

The housing is provided with a main gas inlet 19 at its lower end and a main gas outlet 21 which communicates with the tubing port 11. The main gas inlet and outlet are connected together by a passageway 22.

A main valve seat 23 is provided in passageway 22 and a main valve member 24 cooperates with the main valve seat to control flow of gas through the gas lift valve.

A motor assembly is provided for controlling the opening and closing movement of the main valve 24. This motor assembly is provided by a pressure-responsive member such as piston 25 which has a sliding seal with the piston housing section 16. The piston 25 is connected to main valve 24 by a suitable connecting rod 26. In this form of the valve a piston spring 27 urges the main valve toward closed position.

In the illustrated form of the invention, the outlet 21 is connected through bore 28 to the underside of piston 25 and thence through bleed 29 in the piston to the chamber 32 above piston 25. As is well known with this type of valve, exposing the chamber 32 to casing pressure will cause the main valve to open, and removing the casing pressure from chamber 32 to permit it to reduce to tubing pressure will cause the valve to close.

A suitable pilot valve for controlling flow of casing pressure to chamber 32 is secured to the piston housing 16. The adapter 17 closes the lower end of the bellows housing 18 so that the interior of the bellows housing may be isolated from casing pressure. This is contrary to pilot operated valves heretofore used wherein the bellows housing has had its interior exposed to casing pressure. A plurality of passages 31 extend through the adapter 17 and interconnect the chamber 32 with the interior of bellows housing 18. Thus, the bellows housing will always be exposed at least to outlet or tubing pressure.

In accordance with this invention, a pilot valve is provided for admitting casing gas which will be pilot gas to the interior of the bellows housing and through passages 31 to the chamber 32 to open the main valve.

In accordance with this invention, the pilot gas is fed to the pilot valve and pilot seat in such manner that the pilot gas is effective within the pilot valve seat when the valve is closed to urge the valve toward open position. In the preferred form the pilot gas inlet is provided by a plurality of lateral ports 33 extending inwardly from the periphery of the adapter 17 to a vertical bore 34 within the adapter. This bore is closed at its lower end. The bore provides communication between the pilot gas inlet 33 and the pilot gas outlet at the upper end of the bore 34. Surrounding the pilot gas outlet is a pilot valve seat 35 with which a pilot valve 36 cooperates to control flow through the pilot gas inlet 33.

Means are provided for controlling operation of the pilot valve member 36. Preferably, this means is provided by a pressure responsive member such as bellows 37 connected to valve member 36 by a connecting rod 38 and a spring 39 surrounding rod 38 and urging the pilot valve toward closed position.

It will be noted that the pilot valve and seat are between the pilot valve inlet and the interior of the bellows housing with the pilot valve member on the bellows side of the pilot valve seat. Thus, when the pilot valve is seated, pressure fluid from the pilot valve inlet acts on the pilot valve member within the confines of the pilot valve seat in a direction tending to open the pilot valve.

Inasmuch as the incoming pilot gas flows in an upwardly direction, it is possible to use a ball type check such as the back-check valve 41 positioned in counterbore 42 and cooperable with shoulder 43 to prevent back flow through the pilot valve.

By comparison with the Walton patent referred to hereinabove, it will be noted that the area of pilot valve seat 35 is much larger relative to the valve housing when the valve is constructed in accordance with this invention. This is made possible by reversing the areas exposed to casing pressure and to tubing pressure. In the Walton patent the bellows is exposed to casing pressure and the portion of the Walton pilot valve member within the Walton pilot valve seat is exposed to tubing pressure when the pilot valve is closed. As the area of the valve seat determines the effective area of bellows of Walton, any attempt to increase the area of the Walton valve seat decreases the effective area of the bellows and lengthens the spread of pressure at which the Walton valve would open and close. By contrast it will be noted that with the valve closed in the instant application, casing pressure is effective not on the bellows directly but on the valve within the confines of valve seat 35. This area may be large to give a large effective area exposed to casing pressure to maintain a small spread. As the area of the bellows exposed to tubing pressure is desirably small, the large valve seat 35 is appropriate as this gives a relatively small effective area of the bellows exposed to tubing pressure. In fact, with valves having their main valve member and motor valve of identical construction, the pilot valve may have its areas exactly reversed to obtain the same spread characteristics. That is, with the form illustrated in this invention the areas of the pilot valve member exposed to casing pressure when the pilot valve is closed may be exactly the effective area of the bellows in the form of pilot shown in the Walton patent when the valve member is closed. Of course, the effective area of the bellows in this application with the valve member closed would be equal to the effective area of the valve member within the valve seat of the Walton patent.

As a result of increasing the area of the valve seat, it is possible to increase the cross sectional area of bleed 29 in the motor piston 25. This permits a much faster bleedoff of casing pressure in chamber 32, thus permitting the spring 27 and the differential across the main piston 24 to more rapidly snap the main valve to closed position after the pilot valve closes. Also, the larger bleed port 29 reduces the possibility of trash accumulating in the port and causing malfunction of the valve. As the bleed port is larger, it is better able to dissipate any leakage of pilot gas past the pilot valve 36. It will be apparent that a small bleed will permit pressure leaking past pilot valve 36 to build up in chamber 32 and interfere with normal operation of the valve.

It is also pointed out that as the pilot gas flows upwardly and outwardly past the pilot valve 36, it tends to sweep any trash present out of the valve seat. This should be contrasted with the previous form of pilot valves in which pilot gas is flowing into the seat past the pilot valve and on closing trash may become wedged between the valve and valve seat and cause leakage past the pilot valve member.

In operation, it will be assumed that the valve is positioned in a well and will open at pressure A and close at a pressure A minus 25 pounds. As the pressure within the casing is increased toward pressure A, the main valve and pilot valve are both closed. As the casing pressure reaches the value A, it is effective on the portion of valve member 36 inside of valve seat 35, and the force exerted is sufficient to move the valve member off of its seat. In this instance tubing pressure is present within the bellows housing, and as the bellows have an effective area larger than the area of valve seat 35, this tubing pressure is also urging the pilot valve toward open position. Upon cracking of the pilot valve from its seat, the pressure within the bellows housing begins to immediately increase to casing pressure, thus raising the pressure effective on the bellows and rapidly moving the pilot valve to fully open position. The casing pressure flows through adapter passageways 31 into chamber 32 where it is effective on the motor operated piston 25 to drive the piston downwardly and open the main valve 24. Due to the large flow passages provided for conducting pilot gas to chamber 32, the main valve 24 will snap open with a fairly rapid movement. When the main valve is open, casing fluid will pass from the inlet 19 past the back-check valve indicated generally at 44 and through outlet 21 into the tubing 10 to assist in raising liquid within the tubing. The casing pressure present in chamber 32 above the piston 25 will also tend to escape through bleed 29 down through bore 28 to the outlet 21. However, the bleed 29 will be sized relative to the passages conducting pilot gas to chamber 32 and will maintain the desired differential across the piston 25. As casing pressure reduces toward pressure A minus 25 pounds, the pilot valve will begin to move back towards its seat. As it moves back, a differential begins to form across the seat and the pressure within the bellows housing drops. This permits the pilot valve to move rapidly onto its seat. As the bleed passageway 29 is relatively large, it permits the pressure within chamber 32 to rapidly bleed down toward tubing pressure so that spring 27, together with the differential across the main valve 24, can snap the main valve to closed position. Due to the relatively large size of bleed 29 as compared with the pilot operated gas lift valves heretofore used, the main valve of this invention may move toward its seat more rapidly than pilot operated gas lift valves heretofore used. As soon as the main valve 24 is seated, the entire interior of the valve housing above the main valve stabilizes at tubing pressure and remains at tubing pressure until the pilot valve is opened on the next cycle.

Reference is now made to FIGURES 2 and 3 wherein this invention is shown in a wire line type of valve which employs a fluid motor of slightly different operating characteristics.

The casing of a cased well is indicated at 51 in FIGURE 2. Positioned within the casing is a string of production tubing 52 having a side pocket 53 for receiving the gas lift valve indicated generally at 54. The side pocket 53 has an inlet opening 55 for the passage of gas from the tubing-casing annulus. An opening into the tubing is provided at 56 to permit flow of gas from the port 55 into the tubing when the gas lift valve is open.

Referring now to FIGURE 3, the schematically illustrated valve includes a housing 57 about which spaced seals 58 and 59 are carried. These spaced seals cooperate with the side pocket 53 to seal off the inlet 55 into the inlet 56 and thus permit the valve to control flow through ports 55 and 56 into the tubing.

A gas inlet 61 in the valve body communicates with a gas outlet 62 through a passageway 63. Flow through the passageway 63 is controlled by a main valve seat 64 cooperable with a main valve member 65.

A fluid motor is provided for controlling operation of the main valve member by a fluid piston 66 reciprocal within the cylinder 67. Fluid pressure from the main inlet 61 is effective on the lower surface 66a of piston 66. A bleed passageway shown in dashed lines at 68 through the piston 66, main valve 65 and rod 69 interconnecting these members, permits passage of fluid between the chamber 71 above piston 66 and the outlet 62. Thus, at all times chamber 71 will be pressurized at least to tubing pressure.

In accordance with this invention, a pilot valve is provided for permitting casing pressure to be effective in the chamber 71 to permit the main valve to open. For this purpose a pilot gas inlet 72 is provided between spaced seals 58 and 59. Communicating with the inlet 72 is a fluid passageway 73 which conducts fluid from the inlet to the pilot valve seat 74. A pilot valve member 75 cooperates with the seat 74 to control flow through passage 73. In accordance with this invention the pilot valve is constructed to move in a downstream direction when opening. In other words, upstream pressure from inlet 72 is effective on the area of the valve member defined by pilot seat 74 when the pilot valve is closed.

A bellows 76, or other suitable pressure responsive means, is connected to the valve member 75 to define a selected effective area responsive to tubing pressure. Preferably, the bellows 76 is not charged; that is, its interior is at substantially atmospheric pressure. It will be seen that if the effective area of bellows is slightly larger than the effective area of seat 74, a resulting force urging the bellows towards collapsed position will be provided, as at least tubing pressure is always effective on the bellows through the passageway 77.

Preferably, the pilot valve member is urged toward seated position by a spring 78.

A ball type check 79 prevents back flow through pilot inlet passageway 73.

In operation, the pilot valve, and hence the main valve, will open and close at a selected spread of casing pressure. With the pilot valve closed, casing pressure is effective on the area of the pilot valve defined by pilot valve seat 74. Casing pressure is effective on the side 66a of motor piston 66 and urges the main valve member toward closed position. Tubing pressure is effective on the underside of the main valve member and in chamber 71, and the areas on both sides of the main valve member and the motor piston 66 are so related that under these circumstances the main valve is closed.

Tubing pressure is effective on the bellows 76 through bleed passageway 68, chamber 71, and pilot gas passageway 77.

As casing pressure is increased to a selected pressure, the force exerted by casing pressure on the pilot valve member 75 within the confines of seat 74 exceeds the downward force on the pilot valve member 75. When this occurs, the pilot valve opens. Preferably, the area of bellows 76 is slightly greater than the area of pilot seat 74 and hence upon unseating of pilot valve 75 a larger effective area is exposed to casing pressure to rapidly move the pilot valve member to full open position.

Pilot gas is now free to travel through passages 77 to chamber chamber 71 to raise the pressure within the chamber 71 to casing pressure. Casing pressure will be maintained within chamber 71 as bleed passage 68 is properly sized for this purpose.

As the pressure within chamber 71 increases toward casing pressure, the resulting downward force is sufficient to move main valve member 65 to full open position. As the pilot gas passages are relatively large, the pressure will build up in chamber 71 very rapidly, and the main valve will be snapped to full open position. The large pilot gas passageways will permit the use of a relatively large bleed passageway as compared with the Walton patent.

It will be appreciated that the form of valve shown in FIGURE 3 basically differs from the form of valve shown in FIGURES 1a and 1b in that it is a wire line-run valve, and in that the pressure conditions on the main valve and motor are different. For instance, in FIGURE 1b it will be noted that casing pressure urges the main valve toward seated position and the motor valve is exposed to tubing pressure on both sides when the pilot valve is closed. In the FIGURE 3 form of valve, casing pressure tends to open the main valve and the motor piston 66 has casing pressure on its underside and tubing pressure on its upper side when the pilot valve is closed. Thus it will be seen that regardless of the manner of operation of the main valve or the type of motor utilized to control operation of the main valve, a pilot valve constructed in accordance with this invention will be of great advantage. Of course, other constructions of main valve and fluid motor could be utilized, as is apparent from the two illustrated embodiments in which the fluid motors operate in substantially a different manner.

The foregoing disclosure and description of the invention is illustrative and explanatory thereof and various changes in the size, shape and materials, as well as in the details of the illustrated construction, may be made within the scope of the appended claims without departing from the spirit of the invention.

We claim:

1. A gas lift valve comprising, a housing having a main inlet and a main outlet, a passageway interconnecting said inlet and outlet, a main valve seat in said passageway, a main valve member cooperable with said seat and controlling flow through said passageway, a first pressure-responsive member connected to the main valve member, second pressure-responsive means in said housing, means establishing communication between said outlet and one side of said second pressure-responsive means and one side of the first pressure-responsive member including a bleed passage between said one side of the first pressure-responsive member and the outlet, a pilot gas inlet, means establishing communication between the pilot gas inlet and said one side of said second pressure-responsive means and said one side of the first pressure-responsive member, and a pilot valve seat and pilot valve member positioned between the pilot gas inlet and the second pressure-responsive means and controlling flow through the pilot gas inlet, said pilot valve member associated with said second pressure-responsive means, pressure from said pilot inlet being effective on the valve member when seated in a direction urging the pilot valve member toward unseated position.

2. A gas lift valve comprising, a housing having a main inlet and a main outlet, a passageway interconnecting said inlet and outlet, a main valve seat in said passageway, a main valve member cooperable with said seat and controlling flow through said passageway, a pressure-responsive member connected to the main valve member, bellows means in said housing, means establishing communication between said outlet and said bellows means and one side of the pressure-responsive member including a bleed passage between said one side of the pressure-responsive member and the outlet, a pilot gas inlet, means establishing communication between the pilot gas inlet and said bellows means and said one side of the pressure-responsive member, a pilot valve seat and pilot valve member positioned between the pilot gas inlet and the bellows means and controlling flow through the pilot gas inlet, said pilot valve member connected to said bellows means and positioned on the bellows means side of the pilot valve seat whereby fluid pressure from the pilot gas inlet urges the pilot valve member away from its seat.

3. A gas lift valve comprising, a housing having a main inlet and a main outlet, a passageway interconnecting said inlet and outlet, a main valve seat in said passageway, a main valve member cooperable with said seat and controlling flow through said passageway, a pressure-responsive member connected to the main valve member, bellows means in said housing, means establishing communication between said outlet and said bellows means and one side of the pressure-responsive member including a bleed passage between said one side of the pressure-responsive member and the outlet, a pilot gas inlet, means establishing communication between the pilot gas inlet and said bellows means and said one side of the pressure-responsive member, a pilot valve seat and pilot valve member positioned between the pilot gas inlet and the bellows means and controlling flow through the pilot gas inlet, said pilot valve member connected to said bellows means and positioned on the bellows means side of the pilot valve seat whereby fluid pressure from the pilot gas inlet urges the pilot valve member away from its seat and a ball type backcheck valve in the communication means between the pilot gas inlet and the pilot valve seat.

4. A gas lift valve comprising, a housing having a main inlet and a main outlet, a passageway interconnecting said inlet and outlet, a main valve seat in said passageway, a main valve member cooperable with said seat and controlling flow through said passageway, a pressure-responsive member connected to the main valve member, bellows means in said housing, means establishing communication between said outlet and said bellows means and one side of the pressure-responsive member including a bleed passage between said one side of the pressure-responsive member and the outlet, a pilot gas inlet, means establishing communication between the pilot gas inlet and said bellows means and said one side of the pressure-responsive member, a pilot valve seat and pilot valve member positioned between the pilot gas inlet and the bellows means and controlling flow through the pilot gas inlet, said pilot valve member connected to said bellows means and positioned on the bellows means side of the pilot valve seat whereby fluid pressure from the pilot gas inlet urges the pilot valve member away from its seat, and resilient means urging the pilot valve member toward closed position.

5. A gas lift valve comprising, a housing having a main inlet and a main outlet, a passageway interconnecting said inlet and outlet, a main valve seat in said passageway, a main valve member cooperable with said seat and controlling flow through said passageway, a pressure-responsive member connected to the main valve member, bellows means in said housing, means establishing communication between said outlet and said bellows means and one side of the pressure-responsive member including a bleed passage between said one side of the pressure-responsive member and the outlet, means exposing the other side of the pressure-responsive member to one of the main inlet and main outlet, a pilot gas inlet, means establishing communication between the pilot gas inlet and said bellows means and said one side of the pressure responsive member, a pilot valve seat and pilot valve member positioned between the pilot gas inlet and the bellows means controlling flow through the pilot gas inlet, said pilot valve member connected to said bellows means and positioned on the bellows side of the pilot valve seat whereby fluid pressure from the pilot gas inlet urges the pilot valve member away from its seat.

6. A gas lift valve comprising, a housing having a main inlet and a main outlet, a passageway interconnecting said inlet and outlet, a main valve seat in said passageway, a main valve member cooperable with said seat and controlling flow through said passageway, said housing including a piston housing section, a piston slidable in said housing section and connected to the main valve member, means including a bleed passage connecting one side of the piston in fluid communication with said outlet, an adapter secured to the piston housing, said housing including a closed bellows housing secured to the adapter, conduit means extending through the adapter and establishing fluid communication between said one side of the piston and the interior of the bellows housing, bellows means mounted in the bellows housing, a pilot gas inlet in the adapter, a conduit extending from the pilot gas inlet to a pilot gas outlet communicating with the interior of the bellows housing section, a pilot valve seat surrounding the pilot gas outlet, and a pilot valve member connected to the bellows means and cooperable with the pilot valve seat to control flow of pilot gas.

7. A gas lift valve comprising, a housing having a passageway therethrough controlled by a main valve member, a fluid motor including a chamber connected to the outlet of said passageway through a bleed, said fluid motor controlling operation of the main valve member in response to changes in pressure in said chamber, and means for conducting a pressure fluid to said chamber including a pilot valve member and seat controlling flow through said conducting means, said pilot valve member moving in a downstream direction to open, and means including a pressure responsive element urging the pilot valve member toward seated position, whereby upstream pressure urges the pilot valve member toward open position and effects opening of the pilot valve member when the force exerted by upstream pressure exceeds the force exerted by said means urging the pilot valve member toward seated position.

References Cited in the file of this patent

UNITED STATES PATENTS

| | | |
|---|---|---|
| 2,122,706 | Armstrong | July 5, 1938 |
| 2,236,137 | Grisham | Mar. 25, 1941 |
| 2,573,110 | Robison | Oct. 30, 1951 |
| 2,587,212 | Placette | Feb. 26, 1952 |
| 2,594,831 | Walton | Apr. 29, 1952 |
| 2,994,335 | Dudley | Aug. 1, 1961 |